No. 696,588. Patented Apr. 1, 1902.
F. J. PERKINS.
MACHINE FOR TREATING HIDES OR SKINS.
(Application filed Oct. 2, 1901.)
(No Model.)
3 Sheets—Sheet 1.

Witnesses.
C. H. Garnett
J. Murphy

Inventor.
Franklin J. Perkins

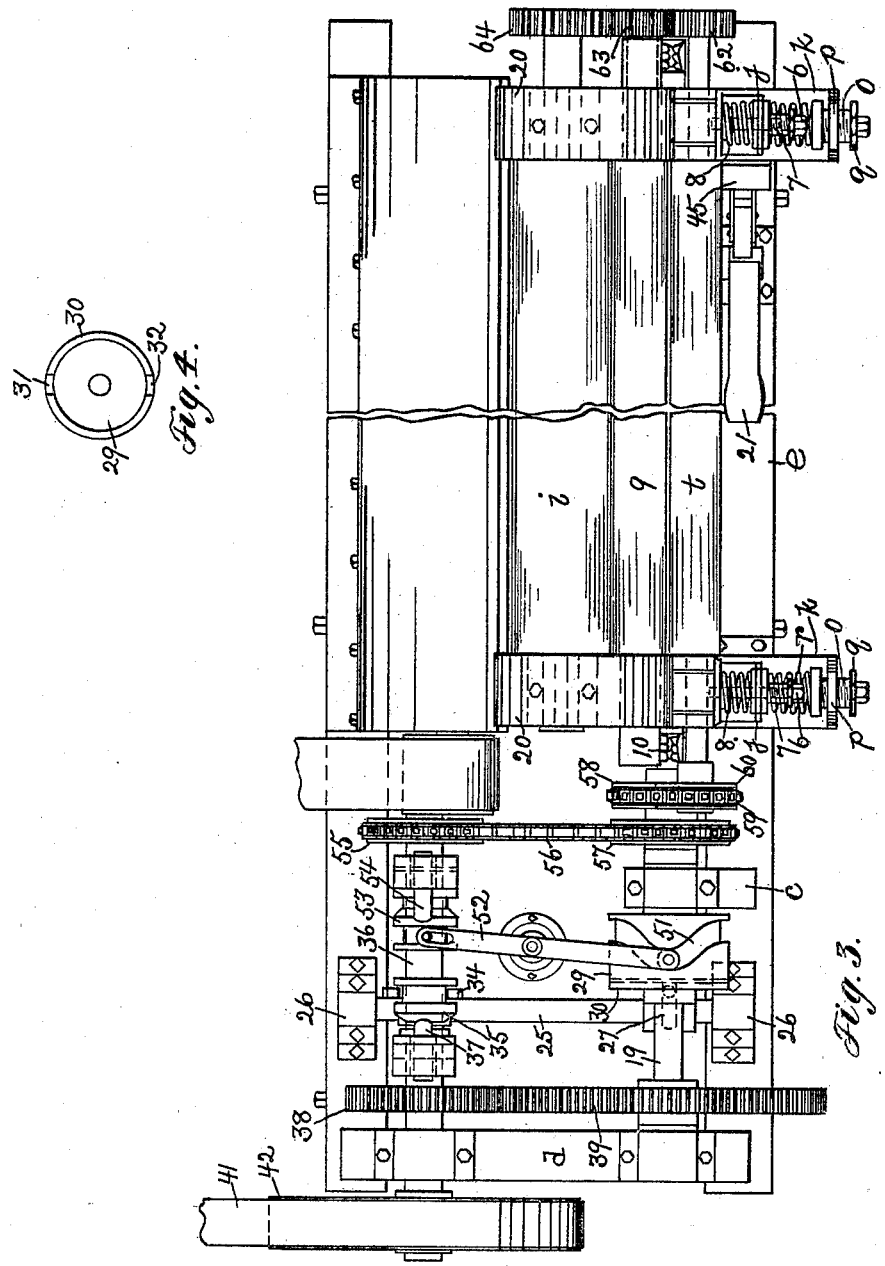

UNITED STATES PATENT OFFICE.

FRANKLIN J. PERKINS, OF WOBURN, MASSACHUSETTS, ASSIGNOR TO VAUGHN MACHINE COMPANY, OF BOSTON, MASSACHUSETTS, A CORPORATION OF WEST VIRGINIA.

MACHINE FOR TREATING HIDES OR SKINS.

SPECIFICATION forming part of Letters Patent No. 696,588, dated April 1, 1902.

Application filed October 2, 1901. Serial No. 77,268. (No model.)

*To all whom it may concern:*

Be it known that I, FRANKLIN J. PERKINS, a citizen of the United States, residing in Woburn, in the county of Middlesex and State of Massachusetts, have invented an Improvement in Machines for Treating Hides or Skins, of which the following description, in connection with the accompanying drawings, is a specification, like characters on the drawings representing like parts.

This invention relates to a machine for treating hides and skins, and is herein shown as embodied in a machine particularly adapted for fleshing and unhairing hides and in which a bodily-movable roll coöperates with a bed-roll and with a feed-roll. The invention has for its object to provide a simple and efficient machine for the purpose specified and one with which the operator is relieved from strain and work, as will be described. For this purpose the bodily-movable roll is operated by a cam-shaft, the rotation of which is positively controlled by the operator and the rotation of the said bed-roll and feed-roll is automatically controlled by the said cam-shaft, as will be described. These and other features of this invention will be pointed out in the claims at the end of this specification.

Figure 1:
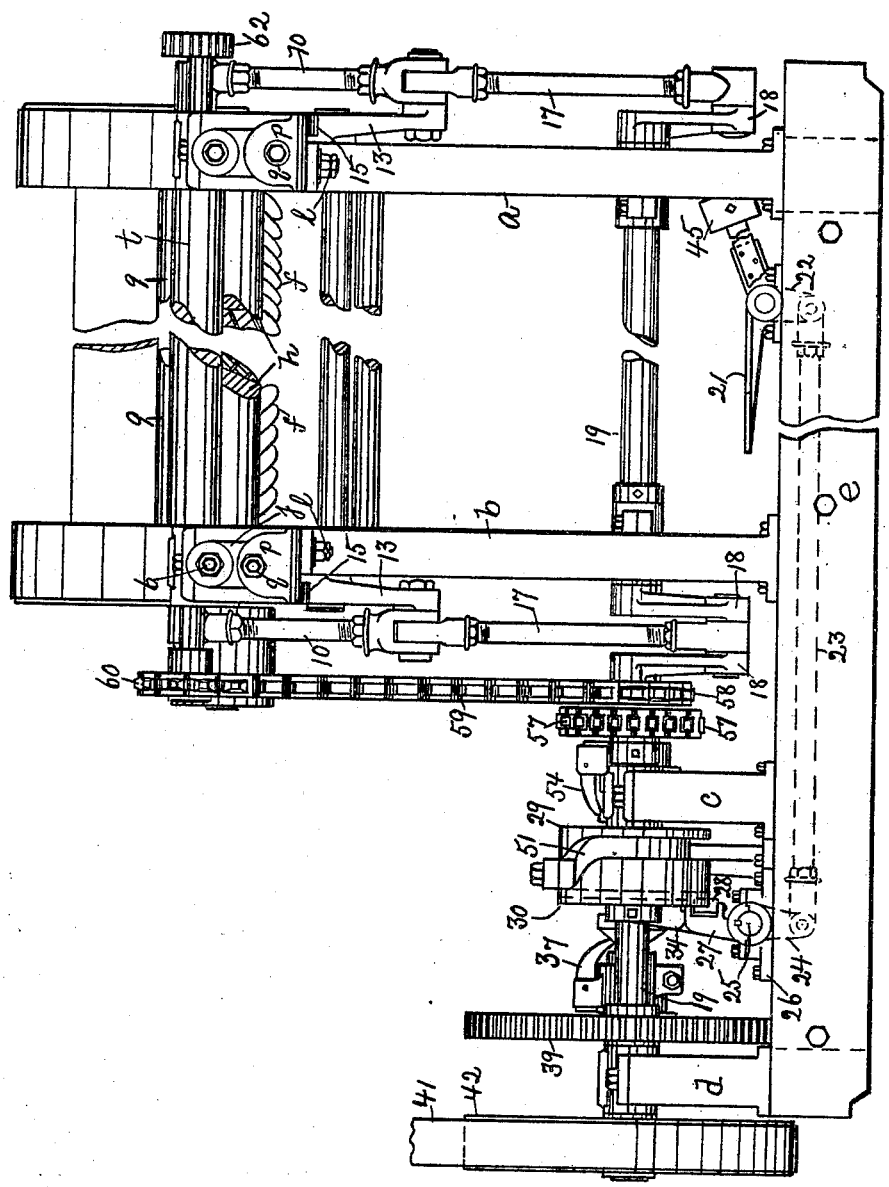
Figure 2:
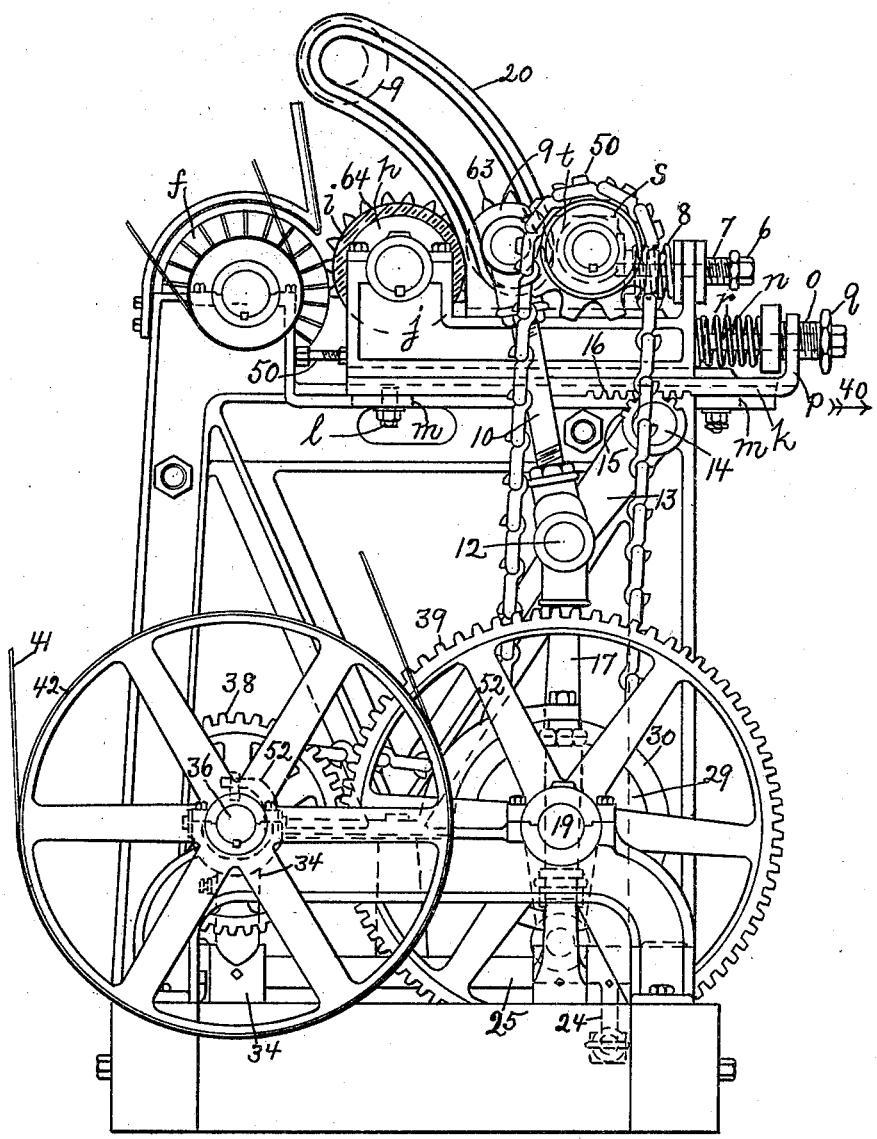

Figure 1 is a front elevation, with parts broken away, of a machine embodying this invention; Fig. 2, a side elevation of the machine shown in Fig. 1 looking toward the right; Fig. 3, a plan view of the machine shown in Fig. 1, and Fig. 4 a detail to be referred to.

The framework of the machine, comprising the uprights or frames $a\ b\ c\ d$, resting on a suitable base $e$, may be of any suitable construction. The uprights or frames $a\ b$ support in suitable bearings an operating-tool, shown as a knife cylinder or roll $f$, having its blades or knives helically arranged, and with which coöperates a bed-roll $h$, provided with a covering $i$, of rubber or other yielding material.

The bed-roll $h$ is movable toward and from the knife-cylinder $f$, and for this purpose is supported in a carriage composed, as herein shown, of two side frames, each made in two parts $j\ k$, suitably secured together, so as to move as one piece under certain conditions, as will be described, and yet permit one of said parts to move independent of the other under other conditions. Each part $k$ is mounted to slide on a side frame of the machine and is secured thereon by bolts or screws $l$, which are extended up through suitable slots $m$ in the side frame and tapped into the part $k$, as shown in Fig. 2. The part $j$ of the carriage is mounted to slide on the part $k$ and is secured to the part $k$ to move therewith, as herein shown, by means of a bolt $n$, which is tapped into the front end of the part $j$ and extends loosely through an externally-threaded sleeve $o$, which engages a threaded opening in an upturned portion $p$ of the part $k$.

The bolt $n$ is provided with a nut or head $q$, which bears against the sleeve $o$, so that when the part $k$ is moved in one direction, as indicated by the arrow 40, the part $j$ will be moved simultaneously therewith, and when the part $k$ is moved in the opposite direction the part $j$ will be moved simultaneously therewith by reason of the bolt-head $q$ being kept in engagement with the sleeve $o$ by a spiral spring $r$, which latter enables the part $j$ to be moved independent of the part $k$ and serves to hold the hide on the bed-roll into engagement with the knife-cylinder with a yielding pressure.

The part $j$ of the carriage also supports the boxes or bearings $s$ for the feed-roll $t$, the said boxes or bearings being mounted on the part $j$ so as to slide thereon and to move independent thereof by the bolt 6, sleeve 7, and spring 8 in a manner similar to that described with relation to the part $j$. The feed-roll $t$ and the bed-roll $h$ are located on the part $j$ of the carriage a distance apart substantially equal to the diameter of a roll 9, which in accordance with this invention is bodily movable with relation to the feed-roll $t$ and the bed-roll $h$. This bodily movement of the roll 9 may be effected, as herein shown, by supporting the roll at each end by a link or arm 10, which is joined at its lower end by the pivot-pin 12 to the end of a lever 13, pivoted, as at 14, to a side frame of the machine and provided with a segmental gear 15, which meshes with the rack-teeth 16, made in the under side of the part k of the carriage.

The links 10 and the levers 13 are joined by connecting-rods 17 with the cranks 18 of a crank-shaft 19, having bearings in the side frames a b and also in the frames c and d. It will be noticed that the opposite ends of the roll 9 are connected by the links 10 and the levers 13 to the crank-shaft 19, as clearly shown in Fig. 1.

By reference to Fig. 2 it will be seen that in the revolution of the crank-shaft 19 upward movement of the connecting-rods 17 will produce an upward movement of the links 10 and a pivotal movement of the levers 13 about their pivots 14. The upward movement of the links or rods 10 lifts the roll 9 bodily away from the bed-roll and feed-roll t, while the pivotal movement of the levers 13 effects a movement of the carriage carrying the said rolls in the direction indicated by the arrow 40 away from the knife-cylinder and into what may be termed the "starting position" of the machine.

The roll 9 in its upward movement may and preferably will be guided by means of slotted arms 20, attached to the parts j of the carriage and preferably curved toward the rear of the machine, so that when the roll 9 is moved upward (see dotted lines, Fig. 2) it may also be carried backward to obtain a sufficient opening between the said roll and the bed-roll to enable the operator to readily insert the hide into its operative position.

After the hide has been inserted into its operative position the roll 9 is moved downward, so as to grip the hide between the feed-roll t and the bed-roll h, while at the same time the carriage is moved backward into its operative position with relation to the knife-cylinder. The movement of the roll 9 and of the carriage may and preferably will be intermittent and placed under the control of the operator, and in the present instance I have shown the machine as provided with a foot-treadle 21, provided with a crank or arm 22, which is joined by a connecting-rod 23 with a crank or arm 24 on a rock-shaft 25, supported in suitable bearings 26, attached to the base e of the framework. The rock-shaft 25 is provided with an arm 27, carrying a roller 28, which coöperates with one face of a cam-hub 29, fast on the cam-shaft 19, the said cam-hub being provided on one side or face with a projecting flange 30, which is provided at substantially diametrically opposite points with slots 31 32, (see Fig. 4,) into which the roller 28 is adapted to enter at half-revolutions of the cam-shaft 19. The revolution of the cam-shaft 19 is controlled by the foot-treadle 21, and for this purpose the rock-shaft 25 is provided with a crank or arm 34, which is forked at its upper end to engage a clutch-hub 35 on a main or driving shaft 36, the clutch-hub 35 coöperating with a suitable clutch mechanism, shown in the present instance as a pivoted dog 37, which when engaged by the beveled end of the clutch-hub 35 is adapted to render a gear 38 fast on the main shaft 36, the gear 38 being in mesh with the gear 39, fast on the cam-shaft. The main shaft 36 may be continuously rotated by means of a belt 41, passed about a pulley 42, fast on the said main shaft.

From the above description and by reference to Figs. 1 and 3 it will be seen that when the foot-treadle 21 is depressed the rock-shaft 25 is moved so as to disengage the roller 28 from one of the slots—for instance, 32—in the cam-hub 29 and simultaneously move the clutch-hub 35 into engagement with the dog or lever 37, thereby rendering the normally loose gear 38 fast on the main shaft 36 and effecting rotation of the cam-shaft 19. As soon as the cam-shaft 19 is set in motion the operator may remove his foot from the treadle 21, as the latter will be prevented from rising by reason of the engagement of the roller 28 with the flange 30 of the cam-hub until the cam-shaft has made a half-revolution, at which time the slot 31 will be brought into line with the roller 18 and will permit the counterweight 45 to elevate the treadle 21 and move the rock-shaft 25 in the opposite direction, so as to withdraw the clutch-hub 35 from engagement with the clutch lever or dog 37, thereby rendering the gear 38 again loose on the main shaft 36 and stopping rotation of the cam-shaft 19. At this time the roll 9, which may and preferably has the function of a pinch and feed roll, is operated as above described and the carriage supporting the bed-roll is moved forward in the direction indicated by the arrow 40. The operator can then place a hide or skin over the bed-roll and between it and the knife-cylinder and adjust the hide into the desired or proper position, after which he again depresses the treadle 21, which rocks the shaft 25, as above described, and again renders the gear 38 fast on the main shaft, thus again setting the cam-shaft 19 in rotation until it has made a half-revolution or until the slot 32 in the flange 30 of the cam-hub is brought into line with the roller 28, at which time the cam-shaft 19 is rendered stationary. During the half-revolution of the cam-shaft as above described the pinch-roll 9 is lowered to engage the hide or skin between it and the feed-roll t and the bed-roll h, while at the same time the carriage is moved backward into position to permit the hide or skin to be operated upon by the knife-cylinder, which position is determined by an adjustable stop, shown as a bolt 50, attached to the part j of the carriage and adapted to engage the stationary frame of the machine. At or about the time the slot 32 in the flange of the cam-hub engages the roll 28 a cam-groove 51 in the periphery of the cam-hub 29 operates a clutch-lever 52, so as to move a clutch-hub 53 (see Fig. 3) into engagement with a clutch lever or dog 54, and thereby render a sprocket-wheel 55 fast on the main shaft 36. When the roll 28 engages the slot 32, the shaft 25 is rocked so as to disengage the clutch-hub 35 from the clutch dog or lever 37, thereby rendering the gear 38 loose on the main shaft 36 and stopping rotation of the gear 39 and cam-shaft 19 at or about the time the clutch dog or lever 54 is locked to the main shaft 36. The sprocket-wheel 55 is connected by a link chain 56 with a sprocket-wheel 57, which is loose on the cam-shaft 19 and which has attached to its hub a second sprocket-wheel 58, (see Fig. 1,) which is connected by a link chain 59 with a sprocket-wheel 60 on the feed-roll $t$. It will thus be seen that the cam-groove 51 renders the sprocket-wheel 55 fast on the driving-shaft 36 and through the gearing above described rotates the feed-roll $t$, which latter is also provided with a gear 62, (see Fig. 1,) which meshes with a gear or pinion 63 on the pinch-roll 9, the gear or pinion 63 meshing with a gear 64 on the bed-roll, so that the feed-roll $t$, pinch-roll 9, and the bed-roll $h$ are rotated to feed the hide forward or in the direction indicated by the arrow 40. The feed-rolls and the bed-roll are thus positively driven from the main shaft 36 as long as the cam-hub 29 maintains the sprocket-wheel 55 clutched to the shaft 36. When it is desired to stop the machine, the operator again depresses the treadle 21, which, as above described, connects the cam-shaft with the driving-shaft through the gears 38 39 and produces a half-rotation of the cam-shaft 19, during which time the sprocket-wheel 55 is unclutched by means of the cam-groove 51 in the periphery of the hub 29 and the carriage is moved forward and the pinch-roll 9 elevated into its starting position.

From the above description it will be seen that the operator is not obliged to keep his foot on the treadle while the hide is undergoing treatment, and therefore he is relieved from a very considerable work and strain, inasmuch as he is only required to depress the treadle to stop the machine and to depress it again to start the machine in operation. He can thus move away from his machine or around it and give his entire attention to the manipulation of the hide or skin.

It will be observed that the rotation of the cam-shaft is positively controlled by the operation of the foot-treadle, whereas the operation of the machine proper—namely, the feed-rolls and bed-roll—is automatically controlled by the cam on the cam-shaft.

I claim—

1. In a machine for treating hides and skins, the combination with a bed-roll, a feed-roll and a movable support therefor, of a roll coöperating with both the said bed-roll and feed-roll and bodily movable with relation thereto, means to effect movement of said support in one direction, and means to effect movement of the bodily-movable roll toward and away from said bed-roll and feed-roll, substantially as described.

2. In a machine for treating hides and skins, the combination with a bed-roll, a feed-roll and a sliding support therefor, of a pinch-roll coöperating with both the said feed-roll and said bed-roll, a shaft, and mechanism operated by said shaft to move said sliding support in one direction and to move said pinch-roll bodily with relation to the said roll and feed-roll, in another direction, substantially as described.

3. In a machine for treating hides and skins, a rotatable knife-cylinder, a carriage movable toward and from the same, a bed-roll carried by said carriage and coöperating with said knife-cylinder, a roll coöperating with said bed-roll and bodily movable toward and from the same, guides for said bodily-movable roll attached to said carriage, means to reciprocate said carriage, and means to move said bodily-movable roll, substantially as described.

4. In a machine for treating hides and skins, a rotatable cylindrical tool, a carriage movable toward and from said tool and composed of two parts, one of which is movable on the other, a bed-roll, a feed-roll, and a pinch-roll carried by said carriage, a yielding medium to normally hold the two parts of the carriage so as to move as one body and which permits the part carrying the said rolls to move independent of the other part of said carriage, means to reciprocate said carriage, and means to move the pinch-roll bodily with relation to said bed-roll and feed-roll, substantially as described.

5. In a machine for treating hides and skins, the combination with a rotatable roll, a reciprocating support therefor, a cam-shaft, mechanism connecting said support with said cam-shaft to effect the reciprocation of the said support, a main or driving shaft, mechanism for connecting said roll with said main shaft, a cam on said cam-shaft controlling the rotation of the said roll, means for driving the cam-shaft from the said main shaft, and mechanism under control of the operator for controlling said means, substantially as described.

6. In a machine for treating hides and skins, a cam-shaft, a driving-shaft, mechanism under the control of the operator for connecting said cam-shaft with said driving-shaft, a cam on said cam-shaft, a roll to engage the hide or skin, and mechanism connected with said roll and controlled by said cam to alternately engage the said roll with and disengage it from said hide or skin, substantially as described.

7. In a machine for treating hides and skins, the combination with a support for the hide or skin, of a roll to engage the hide or skin bodily movable toward and from said support, a rotatable shaft, mechanism connecting said roll with said shaft for producing bodily movement of said roll by the rotation of said shaft, and means independent of said mechanism to guide said roll in its bodily movement, substantially as described.

8. In a machine for treating hides and skins, the combination with a tool to operate on the hide or skin, of a bed-roll coöperating therewith, a reciprocating carriage for said bed-roll, a rotatable shaft, and mechanism connecting said carriage with said shaft to produce reciprocation of said carriage by the rotation of said shaft, substantially as described.

9. In a machine for treating hides and skins, a roll to engage the hide or skin, a cam-shaft, a driving-shaft, mechanism connecting said cam-shaft with said driving-shaft, a cam on said cam-shaft, and independent mechanism for rotating said roll under the control of said cam, substantially as described.

10. In a machine for treating hides and skins, a bodily-movable roll to engage the hide or skin, a shaft, mechanism connecting said roll with said shaft whereby rotation of said shaft produces bodily movement of said roll, a power-shaft, mechanism connecting said power-shaft with the shaft to which said roll is connected, and means for automatically effecting intermittent rotation of the said roll-operating shaft and bodily movement of said roll, substantially as described.

11. In a machine for treating hides and skins, a rotatable roll to engage the hide or skin, a clutch mechanism governing the rotation of said roll, a cam-shaft, a cam thereon governing the action of said clutch mechanism, a second clutch mechanism governing the rotation of said cam-shaft, and means to control the action of said second clutch mechanism, substantially as described.

12. In a machine for treating hides and skins, a rotatable roll to engage the hide or skin, a power-shaft, a clutch mechanism on said power-shaft governing the rotation of said roll, a cam-shaft, a cam thereon governing the action of said clutch mechanism, a second clutch mechanism governing the rotation of said cam-shaft, and means to control the action of said second clutch mechanism, and means to lock the cam-shaft from rotating and maintain the first-mentioned clutch mechanism under the control of the cam, substantially as described.

13. In a machine for treating hides and skins, the combination with a reciprocating carriage, a support for the hide or skin movable therewith, a roll to engage the hide or skin movable with said carriage and toward and from the same, mechanism to reciprocate said carriage, and means to move the said roll toward and from said carriage, substantially as described.

14. In a machine for treating hides and skins, the combination with a movable support, a roll to engage the hide or skin movable with said support and toward and from the same, mechanism to move said support, and means to move the said roll toward and from said support, substantially as described.

In testimony whereof I have signed my name to this specification in the presence of two subscribing witnesses.

FRANKLIN J. PERKINS.

Witnesses:
HORACE P. FARNHAM,
CHARLES H. SYMONDS.